United States Patent
Wood

(10) Patent No.: US 6,176,202 B1
(45) Date of Patent: Jan. 23, 2001

(54) COMBINATION AQUARIUM AND TERRARIUM

(76) Inventor: Robert Wood, 41565 Corte Seda, Temecula, CA (US) 92592

(*) Notice: Under 35 U.S.C. 154(b), the term of this patent shall be extended for 0 days.

(21) Appl. No.: 09/320,743

(22) Filed: May 27, 1999

(51) Int. Cl.[7] .................................................. A01K 63/00
(52) U.S. Cl. .......................................................... 119/246
(58) Field of Search .................................... 119/246, 247, 119/248, 251, 256; D30/104, 105

(56) References Cited

U.S. PATENT DOCUMENTS

| | | | |
|---|---|---|---|
| D. 254,874 | * | 4/1980 | Totten .................................. D30/104 |
| D. 265,856 | * | 8/1982 | Totten .................................. D30/104 |
| 910,905 | * | 1/1909 | Clements . |
| 4,176,620 | * | 12/1979 | Kassos .................................. 119/246 |
| 4,204,499 | * | 5/1980 | Leyva et al. .......................... 119/246 |
| 4,958,593 | * | 9/1990 | Hurlburt et al. . |
| 5,000,118 | * | 3/1991 | Meritt et al. .......................... 119/246 |
| 5,357,903 | | 10/1994 | Rivera . |

* cited by examiner

*Primary Examiner*—Peter M. Poon
*Assistant Examiner*—Yvonne R. Abbott
(74) *Attorney, Agent, or Firm*—Robert T. Spaulding

(57) ABSTRACT

A combination aquarium and terrarium comprising a standard ten-gallon aquarium tank containing water, a physically smaller terrarium and a containment lid. Standard ten-gallon aquarium tanks include a channel shaped band and a channel lip facing the interior of the tank. The terrarium is configured so that, when placed in the tank, the top edges of the terrarium will be positioned between the channel shaped band and the channel lip. A containment lid is provided that mounts on the top side of the channel lip, thereby depressing the terrarium. This downward pressure acts in conjunction with the buoyancy of the terrarium to fix the terrarium in place.

11 Claims, 3 Drawing Sheets

COMBINATION AQUARIUM AND TERRARIUM

BACKGROUND OF THE INVENTION

1) Field of the Invention

The present invention relates generally to small transparent enclosures found in the home such as aquariums and terrariums and more specifically to a standard ten-gallon aquarium tank and a physically smaller terrarium which is secured within the aquarium to provide a simultaneous viewing of marine and terrestrial life.

2) Description of the Prior Art

U.S. Pat. No. 4,176,620 shows an aquarium including an obliquely angled transparent ledge mounted within, providing thereby a water-free area that functions as a terrarium.

U.S. Pat. No. 5,357,903 shows a terrarium that is completely submerged within an aquarium. The patent further describes a life support system for plants contained within the terrarium.

Accordingly, one object and advantage of the present invention is to provide a system in which the terrarium may be easily removed for cleaning and maintenance.

Another object and advantage of this invention is that small animals may be safely and humanely contained within the terrarium.

Another object and advantage of this invention is that terrariums of various sizes and configurations may be freely interchanged within the aquarium.

Further objects and advantages of this invention will become apparent from consideration of the drawings and ensuing description of it.

SUMMARY OF THE INVENTION

The present invention comprises a standard ten-gallon aquarium tank containing water, a physically smaller terrarium that is positioned within the aquarium tank, and a containment lid.

The four sides of a standard ten-gallon aquarium tank are secured at the top by a channel shaped band that defines the perimeter of the tank. The lower surface of the channel facing the inside of the tank terminates in a projection, henceforth called the lip, which is perpendicular to each side of the tank and encompasses the interior surface of the tank.

A judicious placement of soil, gravel, rocks, plants, and small animals will cause the terrarium to overcome the natural tendency to float, but not swamp, so that the top edges of the terrarium are positioned in the region defined by the top of the channel shaped band and the channel lip when the terrarium is placed in the aquarium.

The containment lid is dimensioned to be mounted on the top surface of the channel lip, thereby depressing the terrarium. Latches are provided to secure the containment lid in place. The buoyancy of the terrarium and the surface friction of the containment lid cooperate to fix the terrarium in place within the aquarium tank. The containment lid further comprises at least one aperture, spanned by a fine mesh screen, to provide ventilation. The fine mesh screen is configured so that it may be opened to facilitate maintenance and life support activities for the terrestrial life. An access hatch is incorporated in the containment lid to facilitate maintenance and life support activities for the marine life.

DESCRIPTION OF THE PREFERRED EMBODIMENT

Figure 1:
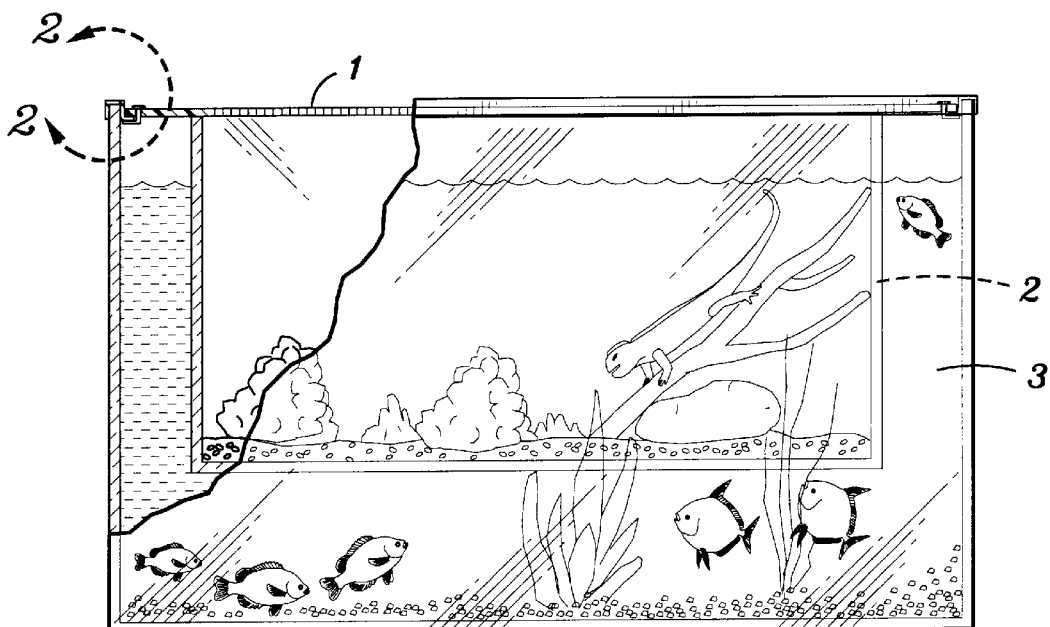
FIG. 1 shows a frontal view of a combination aquarium and terrarium. In this view, the relationship between the containment lid 1, the terrarium 2, and the aquarium tank 3, may be clearly seen.
Figure 2:
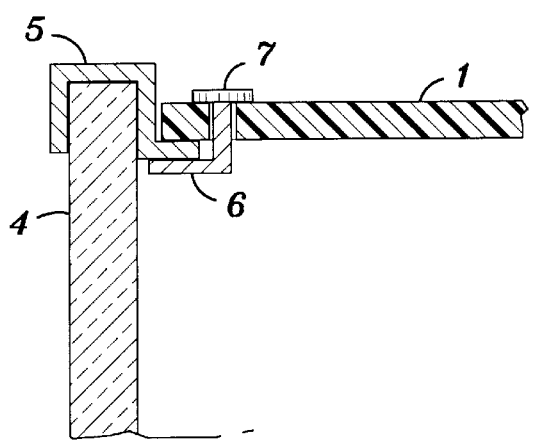
FIG. 2 shows a cutaway view of a typical side 4 of the aquarium tank 3, the channel shaped band 5, the containment lid 1, a typical latch 6, and a latch thumbnut 7. As may be seen, the lower surface of the band facing the inside of the tank terminates in a channel lip, which is perpendicular to each side of the tank
Figure 3:
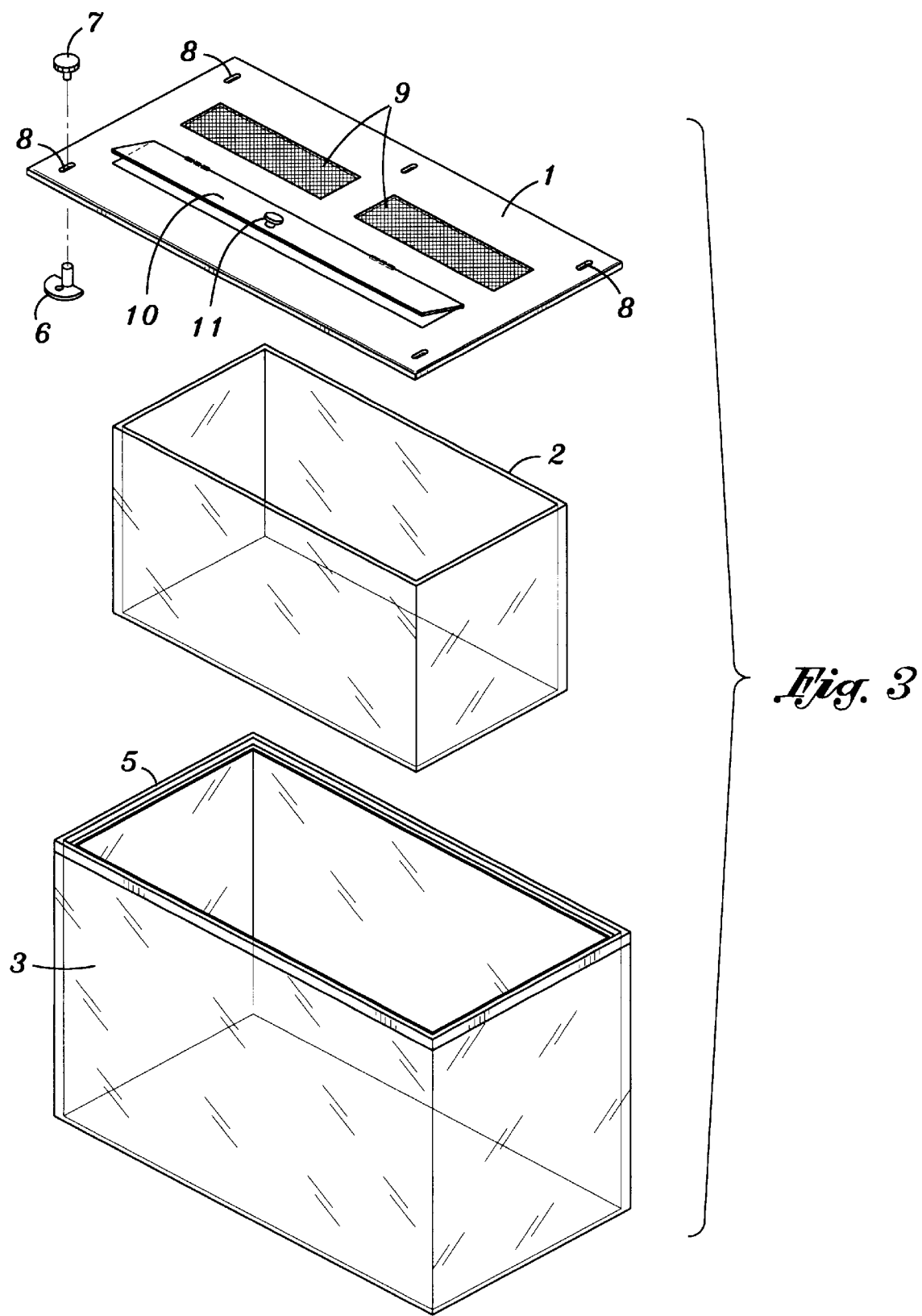
FIG. 3 shows an exploded view of the combination that more clearly illustrates features of the containment lid 1. Here, slots 8 that accommodate latches 6 and thumbnuts 7 are visible. Two fine mesh covered ventilation apertures 9 are shown along with the access hatch 10 and access hatch handle 11. Also in this view, the manner in which the channel shaped band 5 defines the perimeter of the aquarium tank 3 is demonstrated.

FIG. 1 shows a standard ten-gallon aquarium tank 3 containing water and configured as a habitant for marine life. As seen in FIG. 2, standard ten-gallon aquarium tanks are characterized by a channel shaped band 5 that envelops and secures the top of the tank. The lower surface of the channel shaped band facing the interior of the tank terminates in a projection, or channel lip, which is perpendicular to each side of the tank. FIG. 3 shows how the channel shaped band defines the perimeter of the tank.

FIG. 1 also shows a terrarium 2 configured as a habitant for terrestrial life. The contents of the terrarium have been carefully chosen so that, when the terrarium is placed within the aquarium, the buoyancy of the terrarium will cause the top edges of the terrarium to be positioned within the limits defined by the channel lip and the top of the channel shaped band.

FIG. 2 shows how the rectangularly shaped containment lid 1, is dimensioned to be mounted on the top surface of the channel lip. Initially, as illustrated in FIG. 3, all latches 6 are retracted to the rear of their respective slots 8 so that the latches do not protrude beyond the edges of the containment lid. When the containment lid is presented to the channel lip, the latches are pressed forward under the channel lip and locked in place with thumbnuts 7 as shown in FIG. 2. So positioned, the containment lid exerts a downward force on the buoyant terrarium. The buoyancy of the terrarium and the downward force of the containment lid cooperate to secure the terrarium in place within the aquarium tank.

The containment lid further comprises at least one ventilation aperture 9, which is spanned by a fine mesh screen. The fine mesh screen is configured so that it may be opened to facilitate maintenance and life support activities for the terrestrial life.

Also incorporated in the containment lid is an access hatch 10 with attendant access hatch handle 11. The hatch allows entry to the aquarium for maintenance and life support activities for the marine life.

Figure 4:
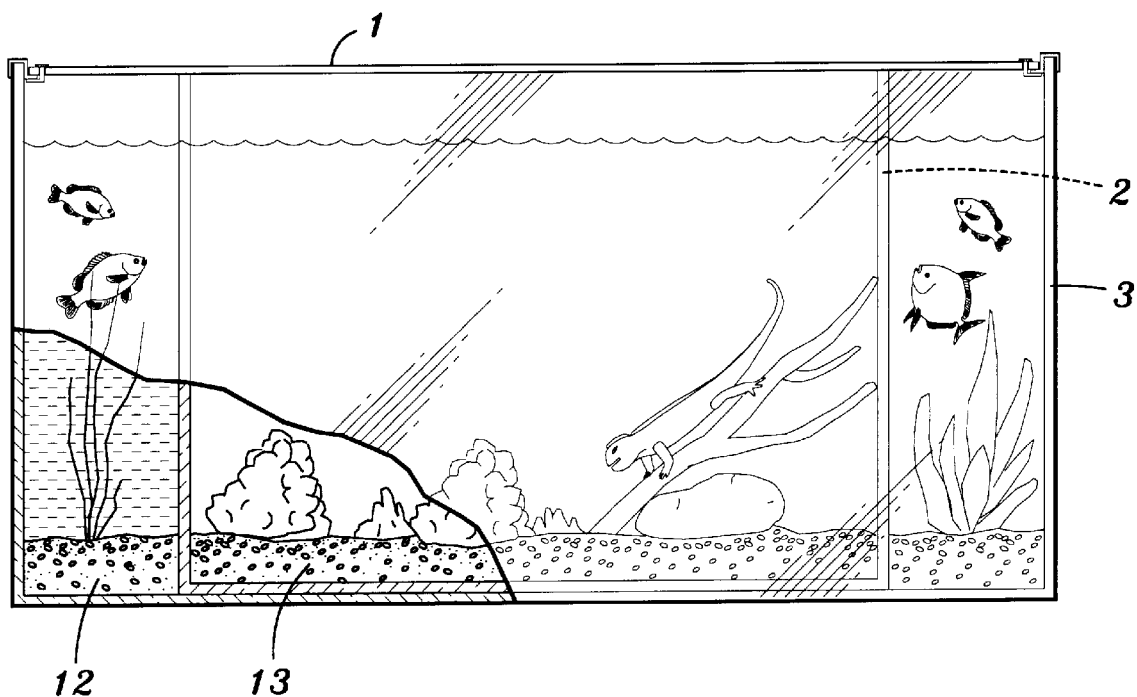
FIG. 4 shows a frontal view of a combination aquarium and terrarium in which the terrarium 2 is dimensioned so that the bottom of the terrarium abuts against the bottom of the aquarium tank 3 when held in place by the containment lid 1. The relationship between the level of aquarium gravel 12 and the inert material contained within the terrarium 13 may be clearly seen in this view.

FIG. 4 illustrates the special case in which a terrarium has been selected that is dimensioned so that the bottom of the terrarium 2 abuts against the bottom of the aquarium tank 3 when the terrarium is secured in place by the containment lid 1. By spreading aquarium gravel 12 about the area defined by the inside periphery of the aquarium tank and the outside periphery of the terrarium so that the top of the gravel layer coincides with the top of the layer of inert material contained within the terrarium 13, an illusion of continuity is presented whereby the terrestrial life contained within the terrarium appears to commingle with marine life contained within the aquarium.

The terrarium may be removed for cleaning or replacement by another terrarium by first loosening the thumbnuts, retracting the latches and removing the containment lid.

Based on the description of FIGS. 1, 2, 3 and 4, it can be seen that this invention provides a combination aquarium and terrarium whereby a simultaneous viewing of marine and terrestrial life is possible.

Although the description above contains many specifications, these should not be construed as limiting the scope of the invention, but as merely providing illustrations of some of the presently preferred embodiments of this invention. For example, the terrarium could be of any shape or size that can be contained within the aquarium.

What is claimed is:

1. A combination aquarium and terrarium comprising a standard ten-gallon aquarium tank containing water and marine life, including a channel shaped band and channel lip facing the interior of the tank; a physically smaller terrarium, containing terrestrial life, having top edges and configured so that when placed in the aquarium, the buoyancy of the terrarium will cause the top edges of the terrarium to be positioned within the limits defined by the top of the channel shaped band and the channel lip; and a containment lid, dimensioned to be mounted on the top surface of the channel lip, thereby exerting a downward force on the buoyant terrarium which cooperates with the buoyancy of the terrarium to secure the terrarium in place within the aquarium tank.

2. The containment lid of claim 1, further including latching means to secure the mounted lid in place.

3. The containment lid of claim 2, further including at least one aperture, spanned by a fine mesh screen which is configured so that said screen may be opened to facilitate maintenance and life support activities for the terrestrial life.

4. The containment lid of claim 3, further including an access hatch to facilitate maintenance and life support activities for the marine life.

5. A combination aquarium and terrarium comprising:
   a) a standard ten-gallon aquarium tank containing water and configured to function as a habitant for marine life, said tank further including a channel shaped band that envelopes and secures the top of the tank and defines the perimeter of the tank, said channel shaped band further including a lower surface facing the interior of the tank that terminates in a channel lip that is perpendicular to each side of the tank;
   b) a terrarium, physically smaller than the aquarium and containing terrestrial life, having top edges and configured so that when placed within the aquarium tank, the buoyancy of the terrarium will cause the top edges of the terrarium to be positioned within the limits defined by the channel lip and the top of the channel shaped band;
   c) a rectangularly shaped containment lid, dimensioned to be mounted on the top surface of the channel lip, said containment lid further including latching means to secure the mounted containment lid in place, thereby exerting a downward force on the buoyant terrarium which cooperates with the buoyancy of the terrarium to secure the terrarium in place within the aquarium tank.

6. The containment lid of claim 5, further including at least one aperture, spanned by a fine mesh screen, which is configured so that said screen may be opened to facilitate maintenance and life support activities for the terrestrial life.

7. The containment lid of claim 6, further including an access hatch to facilitate maintenance and life support activities for the marine life.

8. A combination aquarium and terrarium comprising:
   a) a standard ten-gallon aquarium tank having a bottom and containing water, configured to function as a habitant for marine life, said tank further including a channel shaped band that envelopes and secures the top of the tank and defines the perimeter of the tank, said channel shaped band further including a lower surface facing the interior of the tank that terminates in a channel lip that is perpendicular to each side of the tank;
   b) a terrarium, physically smaller than the aquarium, containing terrestrial life, having top edges, a bottom, a layer of inert material deposited on said bottom, and configured so that when placed within the aquarium tank, the buoyancy of the terrarium will cause the top edges of the terrarium to be positioned within the limits defined by the channel lip and the top of the channel shaped band;
   c) a rectangularly shaped containment lid, dimensioned to be mounted on the top surface of the channel lip, said containment lid further including latching means to secure the mounted containment lid in place, thereby exerting a downward force on the buoyant terrarium, causing the bottom of the terrarium to abut against the bottom of the aquarium.

9. The containment lid of claim 8, further including at least one aperture, spanned by a fine mesh screen, which is configured so that said screen may be opened to facilitate maintenance and life support activities for the terrestrial life.

10. The containment lid of claim 9, further including an access hatch to facilitate maintenance and life support activities for the marine life.

11. The combination aquarium and terrarium of claim 8, further including a layer of aquarium gravel spread about the area defined by the inside periphery of the aquarium tank and the outside periphery of the terrarium so that the top of the gravel layer coincides with the top of the layer of inert material contained within the terrarium, thereby enhancing the illusion of continuity whereby the terrestrial life contained within the terrarium appears to commingle with marine life contained within the aquarium.

* * * * *